US007007844B2

(12) United States Patent
Barkan et al.

(10) Patent No.: US 7,007,844 B2
(45) Date of Patent: Mar. 7, 2006

(54) READER FOR ELECTRO-OPTICALLY READING INDICIA THROUGH VERTICAL WINDOW AT WHICH FULL COVERAGE, OMNI-DIRECTIONAL SCAN PATTERN IS GENERATED

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 111 days.

(21) Appl. No.: 10/677,522

(22) Filed: Oct. 2, 2003

(65) Prior Publication Data

US 2005/0072844 A1    Apr. 7, 2005

(51) Int. Cl.
*G06K 7/10* (2006.01)
(52) U.S. Cl. ............ 235/454; 235/462.38; 235/462.39; 235/462.4
(58) Field of Classification Search ................ 235/454, 235/462.39, 462.4, 462.38, 39, 40
See application file for complete search history.

(56) References Cited

U.S. PATENT DOCUMENTS

| | | | |
|---|---|---|---|
| 4,647,143 A | 3/1987 | Yamazaki et al. | |
| 4,652,732 A | 3/1987 | Nickl | |
| 5,059,779 A | 10/1991 | Krichever et al. | |
| 5,216,232 A * | 6/1993 | Knowles et al. | 235/462.4 |
| 6,045,046 A * | 4/2000 | Detwiler | 235/114 |
| 6,076,735 A | 6/2000 | Saegusa | |
| 6,543,694 B1 * | 4/2003 | Detwiler | 235/462.4 |
| 6,786,413 B1 * | 9/2004 | Gurevich et al. | 235/462.4 |

FOREIGN PATENT DOCUMENTS

| | | |
|---|---|---|
| EP | 0 874 328 A3 | 10/1998 |
| GB | 2 180 943 A | 4/1987 |

\* cited by examiner

*Primary Examiner*—Diane I. Lee
*Assistant Examiner*—Seung H Lee
(74) *Attorney, Agent, or Firm*—Kirschstein, et al.

(57) ABSTRACT

A vertical slot scanner generates a full coverage scan pattern for reading symbols presented or moved past a vertical window. Scan lines are generated in upper and lower central regions of the window to improve scanner productivity.

17 Claims, 4 Drawing Sheets

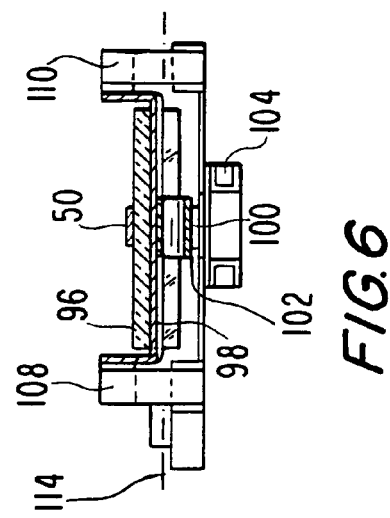
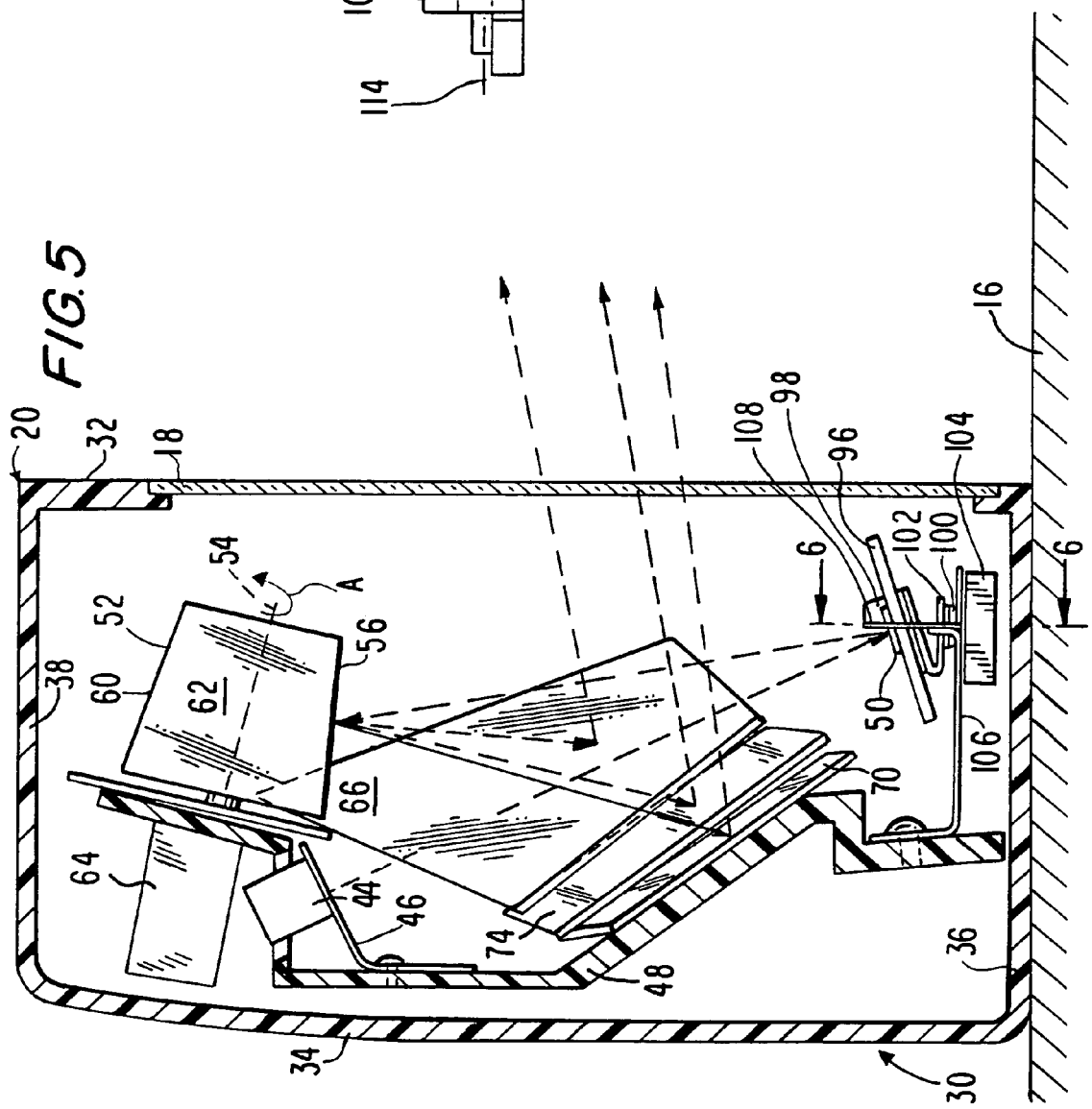

READER FOR ELECTRO-OPTICALLY READING INDICIA THROUGH VERTICAL WINDOW AT WHICH FULL COVERAGE, OMNI-DIRECTIONAL SCAN PATTERN IS GENERATED

BACKGROUND OF THE INVENTION

1. Field of the Invention

The present invention generally relates to an electro-optical reader for reading indicia such as a bar code symbol and, more particularly, to generating a full coverage, omni-directional scan pattern at a vertical window of the reader to insure reliable reading of the symbol through the window.

2. Description of the Related Art

Flat bed laser readers, also known as horizontal slot scanners, have been used to electro-optically read bar code symbols, particularly of the Universal Product Code (UPC) type, at a point-of-transaction workstation in supermarkets, warehouse clubs, department stores, and other kinds of retailers for many years. As exemplified by U.S. Pat. Nos. 5,059,779; 5,124,539 and 5,200,599, a single, horizontal window is set flush with, and built into, a horizontal countertop of the workstation. Products to be purchased bear an identifying symbol and are slid across the horizontal window through which a multitude of scan lines is projected in a generally upwards direction. When at least one of the scan lines sweeps over a symbol associated with a product, the symbol is processed and read.

Instead of, or in addition to, a horizontal slot scanner, it is known to provide a vertical slot scanner which is typically a portable reader placed on the countertop such that its window is generally vertical and faces an operator at the workstation. A scan pattern generator within the vertical reader projects a multitude of scan lines in a generally outward direction through the vertical window toward the operator. The operator slides the products past the vertical window from right to left, or from left to right, or the operator merely presents the symbol on the product to the center of the vertical window, the choice depending on operator preference or on the layout of the workstation.

Each product must be oriented by the operator with the symbol facing away from the operator and directly towards the vertical window. Hence, the operator cannot see exactly where the symbol is during scanning. In typical "blind-aiming" usage, the operator first visually locates the symbol on the product, and then turns the product about a vertical axis to aim the symbol at the reader. It is not uncommon for the operator to unintentionally position the symbol in a plane rotated about 20 to 30 degrees away from the plane of the window.

The blind-aiming of the symbol is made more difficult because the position and orientation of the symbol are variable. The symbol may be located low or high, or right to left, on the product, or anywhere in between. The symbol may be oriented in a "picket fence" orientation in which the elongated parallel bars of the one-dimensional UPC symbol are vertical, or in a "ladder" orientation in which the symbol bars are horizontal, or at any orientation angle in between.

In such an environment, it is important that the scan lines located at, and projected from, the vertical window provide a full coverage scan pattern which extends down as close as possible to the countertop, and as high as possible above the countertop. The scan pattern must include scan lines oriented to read symbols positioned in any possible way across the entire height of the scan pattern.

In some installations of a vertical slot scanner, there is insufficient available work space to slide products across the countertop in front of the vertical window, in which case, the operator will typically present the symbol by holding the product more or less stationary in front of the vertical window. Many operators intuitively expect the reader to work best when the symbol is presented to the center of the vertical window. Yet, the known vertical slot scanners have "dead zones" empty of scan lines at upper central regions of the vertical windows and thus cannot read symbols in the picket fence orientation when the symbols are located above the central regions of the windows. Some of the known vertical slot scanners also have such dead zones at lower central regions of the vertical windows and thus cannot read symbols in the picket fence orientation when the symbols are located below the center regions of the windows. These dead zones result in some products not being read the first time that they are slid past, or presented to, the window, thereby slowing down transaction processing and reducing productivity.

All known vertical slot scanners have scan patterns that grow as they are projected into space in front of the window. This allows them to cover a larger area on products positioned several inches away from the window and, indeed, reader performance improves if the product is positioned more remote from the window. However, many operators intuitively feel that the reader will work best if the symbol is positioned right up close to the window. Hence, to deal with real life usage, it is important that the scan pattern fills the entire height of the window, and then grows rapidly as the scan pattern is projected into space in front of the window.

A known scan pattern generator in a vertical slot scanner in accordance with the prior art includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the vertical window as a scan pattern of scan lines. However, as noted above, the scan pattern of the prior art vertical slot scanner does not entirely fill the vertical window and has dead zones, especially above and below the central region of the vertical window, which limit reader performance.

SUMMARY OF THE INVENTION

Objects of the Invention

One object of this invention is to advance the state of the art of vertical slot scanners.

Another object of this invention is to generate a scan pattern having full coverage at and past the vertical window of such scanners.

Still another object of this invention is to create an omni-directional scan pattern of high scan line density and devoid of dead zones, especially above and below a central region of the vertical window, to increase the likelihood that an indicia of random orientation will be read.

FEATURES OF THE INVENTION

In keeping with these objects and others which will become apparent hereinafter, one feature of this invention resides, briefly stated, in a reader for electro-optically reading indicia, such as bar code symbols, associated with objects passing through a point-of-transaction workstation having a countertop. The reader comprises a housing supported on the countertop and having a window lying in a generally vertical plane when so supported. A rotary mirrored component is mounted in the housing for rotation about an axis. A plurality of stationary, folding mirrors is mounted in the housing and is arranged generally about the axis. A light source is mounted in the housing for generating and directing a light beam to the rotary component for reflection therefrom to the stationary mirrors for reflection therefrom through the window to the indicia to be read. A drive is mounted in the housing for rotating the rotary component to sweep the light beam across the stationary mirrors and form a scan pattern comprising a plurality of scan lines at and past the window.

In accordance with this invention, the stationary mirrors include a first pair of mirrors for reflecting first ones of the scan lines, a second pair of mirrors for reflecting second ones of the scan lines, and a third pair of mirrors for reflecting third ones of the scan lines. More specifically, the third pair of mirrors is intermediate, and tilted relative to, the first and second pairs, thereby reflecting the third ones of the scan lines at an upper central region of the window. This eliminates the aforementioned prior art dead zone above the central region of the window and creates an omni-directional scan pattern which more fully fills and covers the window.

The stationary mirrors are situated between the window in a front wall of the housing and a rear wall. The third pair of mirrors is upwardly tilted such that its lower edges are closer to the window than the lower edges of the mirrors of the second pair, and its upper edges are closer to the rear wall than the upper edges of the mirrors of the second pair.

In order to eliminate the aforementioned prior art dead zone below the central region of the window, the lower edges of the second mirrors are positioned close to a base wall on which the housing rests on the countertop.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a sectional view taken on line 5—5 of FIG. 3;

FIG. 6 is an enlarged sectional view taken on line 6—6 of FIG. 5; and

DETAILED DESCRIPTION OF THE PREFERRED EMBODIMENTS

Figure 1:
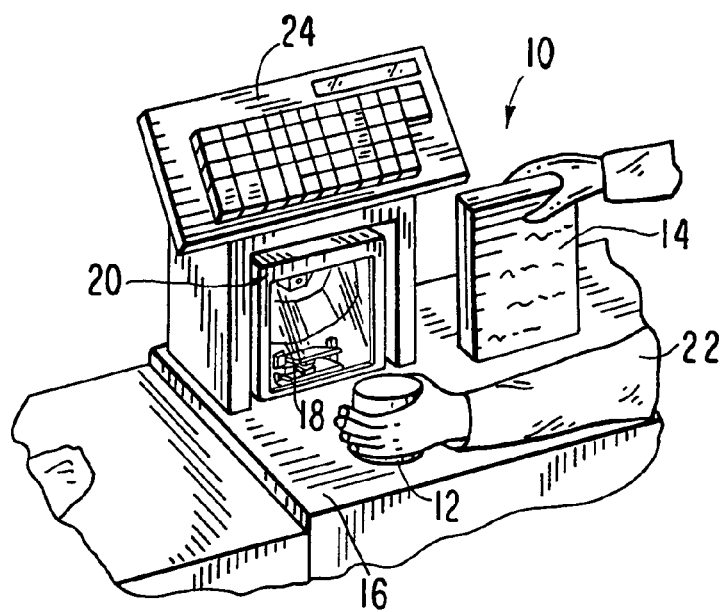
FIG. 1 is a broken-away perspective view of an electro-optical reader in accordance with this invention mounted on a countertop of a workstation during reading of symbols on products passing therethrough.

Reference numeral 10 generally identifies a workstation for processing transactions and specifically a checkout counter at a retail site at which products, such as a can 12 or a box 14, each bearing a bar code symbol, are processed for purchase. The counter includes a countertop 16 across which the products are slid past a vertical window 18 of a vertical slot reader 20 mounted on the countertop 16. A checkout clerk or operator 22 is located at one side of the countertop, and the reader 20 is located at the opposite side. A cash/credit register 24 is located within easy reach of the operator.

As described in detail below, a scan pattern generator within the reader 20 generates a scan pattern at the window 18, and projects the scan pattern into space away from the reader in an outward direction toward the operator. The scan pattern is comprised of multiple scan lines, at least one of which is intended to sweep over at least part of a symbol associated with, and typically printed on packaging for, a product to be purchased. Once the symbol has been swept, light scattered off the symbol is detected, digitized and decoded in a manner well known in this art in order to identify the product. Once identified, a look-up table in a database can be accessed by the reader to retrieve information, such as a price for the product, and this retrieved information can then be processed in known manner to complete a purchase transaction at the workstation.

As described above, the operator must aim the symbol at the window, even though the symbol faces at least partly, if not completely, away from the operator's line of sight. Aiming is further complicated by the fact that the symbols may have different orientations relative to the countertop, the symbols may be located at various elevations relative to the countertop, the symbols may be moved past the window at different speeds, the symbols may be presented in a more or less stationary presentation relative to the window, the symbols may be positioned relatively close to or relatively far away from the window, the symbols may be presented to different regions of the window and at different angles relative to the plane of the window, and there exist dead zones relatively empty of scan lines in the scan pattern in which the symbols cannot be read.

Figure 2:
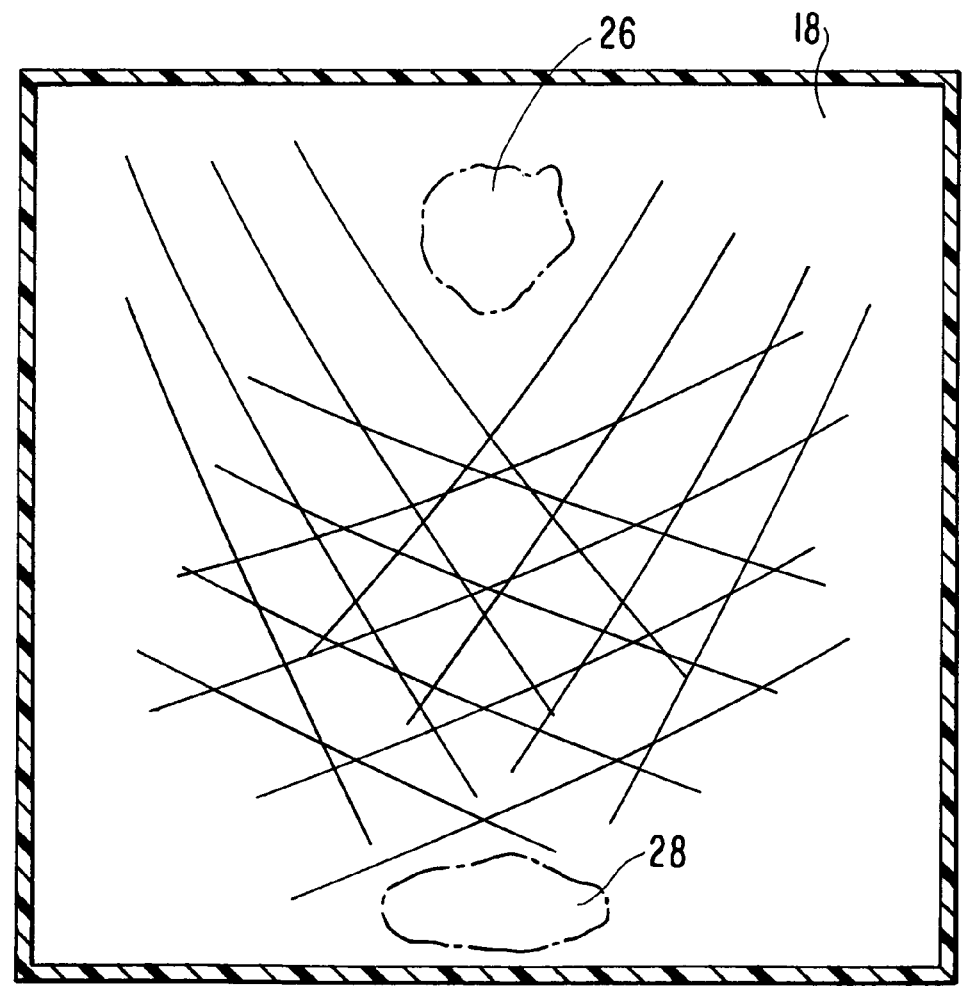
FIG. 2 is a sectional view at a vertical window of a known vertical slot scanner depicting a scan pattern with dead zones in accordance with the prior art.

FIG. 2 depicts a prior art scan pattern at a vertical window 18 of a vertical slot scanner having an upper dead zone 26 above a central region of the window and a lower dead zone 28 below a central region of the window. Each dead zone 26, 28 has no scan lines to sweep the symbol and, hence, a symbol cannot be read therein.

Figure 3:
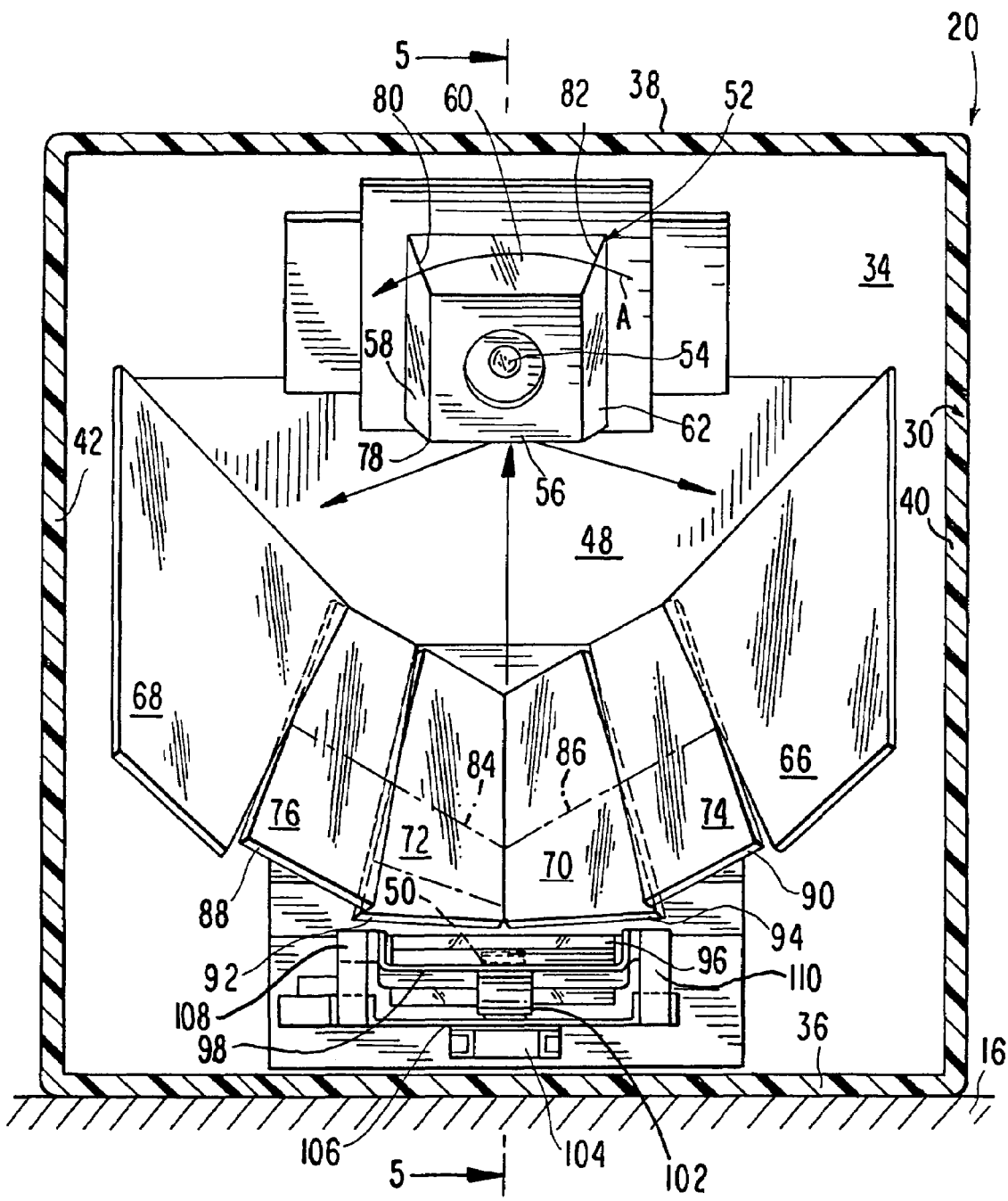
FIG. 3 is a front sectional view at a vertical window of the reader of FIG. 1.

In accordance with this invention, the reader 20 includes a parallelepiped housing 30 which, as best seen in FIGS. 3 and 5, has a front wall 32 in which the window 18 is mounted, a rear wall 34 spaced rearwardly of the front wall, a base or bottom wall 36 which rests on the countertop 16, a top wall 38 spaced upwardly of the bottom wall, and a pair of side walls 40, 42 extending between the top and bottom walls, as well as between the front and rear walls. The window 18 lies in a generally vertical plane in use, and may be tilted slightly relative to the vertical axis.

As best seen in FIG. 5, a light source, such as laser 44, is mounted on a bracket 46 attached to a frame 48 mounted within the housing 30. The laser 44 emits a laser beam to an oscillatable, planar, scan mirror 50 for reflection therefrom to a rotary mirrored component 52 mounted on the frame 48 for rotation about an axis 54 in the direction of arrow A. The component 52 has rotary main mirrors 56, 58, 60, 62 at its periphery. The component 52 is preferably a molded frustopyramidal block having four outer planar walls on which four planar mirrors are mounted, or on which a specular coating of light-reflecting material is applied to serve as the planar mirrors. Each main mirror 56, 58, 60, 62 is tilted at a different angle of inclination relative to the axis 54. A drive, preferably an electric motor 64, is mounted in the housing to rotate the component 52.

As best seen in FIG. 3, a plurality of stationary, light-folding, planar mirrors is mounted on the frame 48 generally about the axis 54 along an incomplete annular row or arcuate distance less than 360°. The stationary mirrors include a first pair of outer or wing mirrors 66, 68 at opposite ends of the row, a second pair of inner or center mirrors 70, 72 adjacent each other at the central region of the row, and a third pair of intermediate or tilted mirrors 74, 76. Mirror 74 is tilted relative to mirrors 66, 70 and is located between mirrors 66, 70. Mirror 76 is tilted relative to mirrors 68, 72 and is located between mirrors 68, 72. Light reflected off the main mirrors 56, 58, 60, 62 is directed to the stationary mirrors 68, 76, 72, 70, 74, 66 in succession for reflection therefrom toward and through the window 18.

Figure 4:
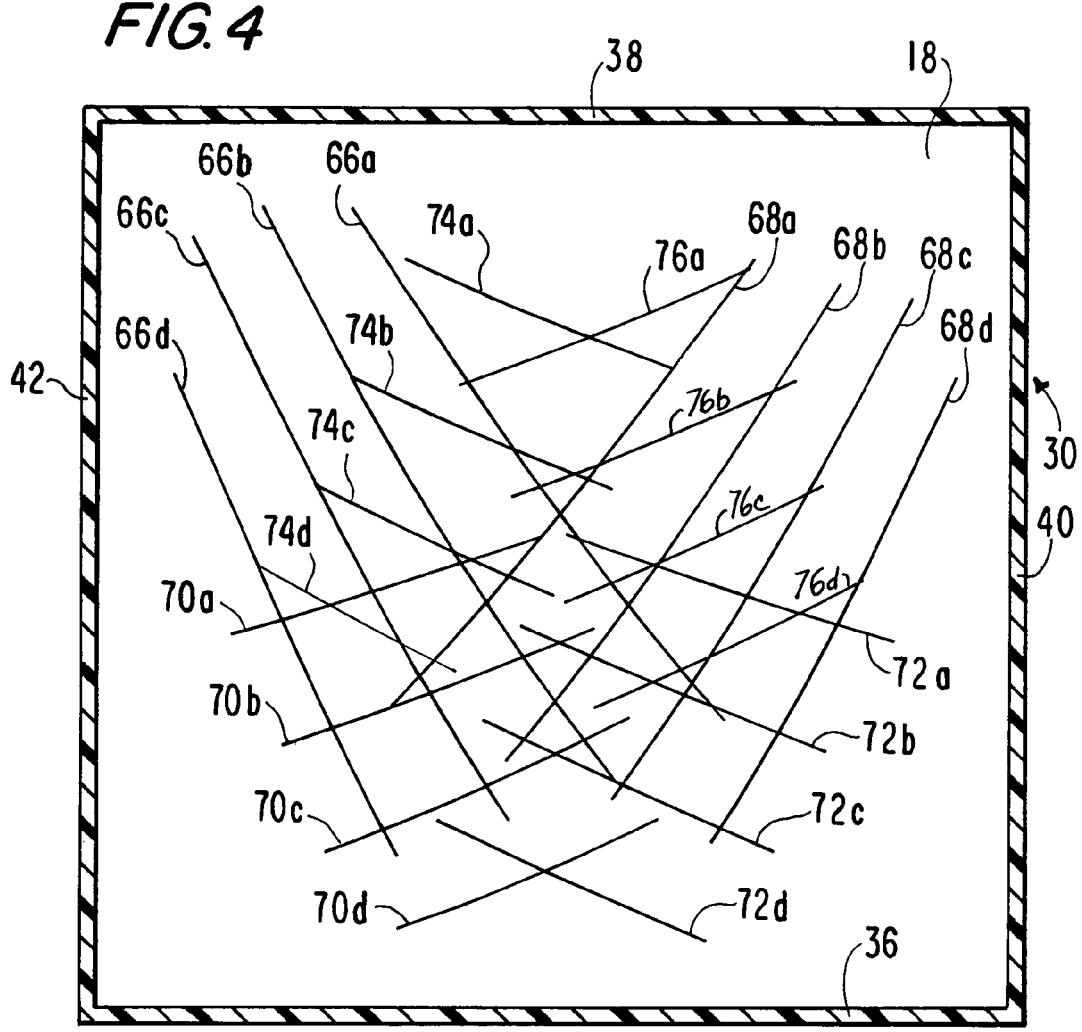
FIG. 4 is a view analogous to FIG. 2 depicting a scan pattern generated by the reader of FIG. 3.

More specifically, during rotation of the component 52, a portion of main mirror 58 adjacent its leading edge 78 reflects the incident light beam from the scan mirror 50 onto outer mirror 68 and, in succession, onto stationary mirrors 76, 72, 70, 74 and 66 until its trailing edge 80 clears the incident light beam, thereby generating six scan lines 68a, 76a, 72a, 74a, 66a as shown in FIG. 4 at the window 18. Next, a portion of main mirror 60 adjacent edge 80 reflects the incident light beam onto the stationary mirrors 68, 76, 72, 70, 74, 66 until its trailing edge 82 clears the incident light beam, thereby generating six more scan lines 68b, 76b, 72b, 70b, 74b, 66b as shown in FIG. 4. Thereupon, in an analogous manner, the main mirror 62 generates additional scan lines 68c, 76c, 72c, 70c, 74c, 66c and the main mirror 56 generates additional scan lines 68d, 76d, 72d, 70d, 74d, 66d. The groups of scan lines with the suffixes "a", "b", "c" and "d" are spaced apart because, as noted above, the main mirrors 56, 58, 60 and 62 lie at different angles of inclination relative to axis 54.

As a comparison of FIGS. 2 and 4 indicates, the dead zones 26, 28 are eliminated, or at least greatly reduced in area, due to the presence of scan lines therein. Thus, the tilted mirrors 74, 76 are responsible for adding scan lines 74a, b, c, d and 76a, b, c, d to the upper central region of the window to reduce the size of the upper dead zone 26, and the inner mirrors 70, 72 are responsible for adding scan lines 70a, b, c, d and 72a, b, c, d to the lower central region of the window to reduce the size of the lower dead zone 28. These scan lines produced by the tilted mirrors 74, 76 and inner mirrors 70, 72 are inclined and, hence, permit symbols having both picket fence and ladder orientations to be read.

More specifically, as shown in FIG. 3, imaginary axes 84, 86 are shown in the plane of the inner mirrors 72, 70. The tilted mirrors 76, 74 are pivoted about these imaginary axes through arcs of about 9°. The lower edges 88, 90 of the tilted mirrors 76, 74 are positioned closer to the window than, for example, the lower edges 92, 94 of the inner mirrors 72, 70. The tilt of the tilted mirrors out of the planes of the inner mirrors serves to reflect the additional scan lines into the upper central region of the window.

The lower edges 92, 94 of the inner mirrors are positioned relatively close to the bottom wall 36 and are preferably co-linear. The lower portions of the inner mirrors serve to reflect the additional scan lines into the lower central region of the window.

Figure 7:
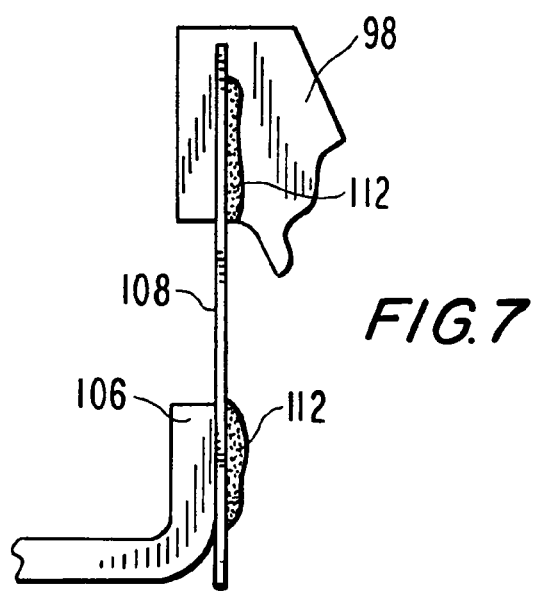
FIG. 7 is an enlarged, broken-away detail of part of the arrangement of FIG. 6.

Additional movement of the scan lines can be achieved by oscillating the scan mirror 50. As shown in FIGS. 5–7, the scan mirror 50 is mounted on a light collection mirror 96 which is, in turn, mounted on a mirror bracket 98. At least one permanent magnet 100 is mounted on one leg of a U-shaped support 102 whose other leg is connected to the mirror bracket 98.

An electromagnetic coil 104 is mounted on a coil bracket 106 which, in turn, is mounted on the frame 48. A pair of planar leaf springs 108, 110, preferably constituted of Mylar™ material about 10 mils thick, is mounted between the coil bracket 106 and the mirror bracket 98 at opposite sides of the scan mirror 50. As shown in FIG. 7 for representative spring 108, its opposite ends are secured to the brackets 106, 98 by epoxy 112.

Upon application of a periodic, alternating drive signal to the electromagnetic coil 104, an alternating magnetic field is generated which interacts with the permanent magnetic field of the magnet 100, thereby attracting and/or repelling the magnet 100, together with the support 102, the mirror bracket 98, and the mirrors 50, 96, all of which flex the leaf springs 108, 110 at their centers about the axis 114 to one end position. Thereupon, the springs restore these components back to their initial positions with or without the aid of the interacting magnetic fields. A typical oscillation for these components is on the order of 1° at a frequency of about 40 Hz.

The oscillation of the scan mirror 50 causes still more scan lines to be generated in the scan pattern of FIG. 4, thereby further improving reader performance. The oscillating collection mirror 96 collects light scattered off the symbol and directs the scattered light to a photodetector (not shown) for generating an analog electrical signal indicative of the symbol. The electrical signal is then digitized and decoded in known manner to identify the product relating to the symbol.

Almost all decoders in current use can decode a symbol even if no individual scan line crosses the entire symbol, because many symbologies, i.e., UPC, EAN and JAN, are designed to be decoded in halves. In other words, one scan line can cover only half the symbol, and another scan line, anywhere in the scan pattern, can cover the other half. The decoder then assembles the two halves and, in some cases, some decoders are capable of assembling even smaller fractions of the symbol. This is especially desirable when truncated symbols, or damaged or wrinkled symbols, are to be read where it may not be possible to scan the entire symbol with a single scan line.

It will be understood that each of the elements described above, or two or more together, also may find a useful application in other types of constructions differing from the types described above.

While the invention has been illustrated and described as embodied in a reader for electro-optically reading indicia through a vertical window at which a full coverage, omni-directional scan pattern is generated, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading indicia associated with objects passing through a point-of-transaction workstation having a countertop, the reader comprising:
   a) a housing supported on the countertop and having a window lying in a generally vertical plane when so supported;
   b) a rotary mirrored component mounted in the housing for rotation about an axis;
   c) a plurality of stationary, folding mirrors mounted in the housing and arranged generally about the axis;
   d) a light source mounted in the housing for generating a light beam;
   e) a light oscillator for oscillating and directing the light beam to the rotary component for reflection therefrom to the stationary mirrors for reflection therefrom through the window to the indicia to be read; and
   f) a drive in the housing for rotating the rotary component to sweep the oscillating light beam across the stationary mirrors and form a scan pattern comprising a plurality of scan lines at and past the window;
   g) wherein the stationary mirrors include a first pair of mirrors for reflecting first ones of the scan lines, a second pair of mirrors for reflecting second ones of the scan lines, and a third pair of mirrors intermediate, and tilted relative to, the first and second pairs of mirrors, for reflecting third ones of the scan lines at an upper central region of the window, thereby creating a full coverage omni-directional scan pattern for reading the indicia.

2. The reader of claim 1, wherein the housing has a parallelepiped shape and has a base on which the housing is supported on the countertop.

3. The reader of claim 1, wherein the rotary component has a plurality of planar mirrors arranged around the axis.

4. The reader of claim 1, wherein each of the stationary mirrors is planar.

5. The reader of claim 4, wherein the stationary mirrors are arranged in succession along a row, wherein the first pair of mirrors are located at opposite ends of the row, wherein the second pair of mirrors are located adjacent each other at a central region of the row, and wherein each mirror of the third pair is located between a respective mirror of the first pair and a respective mirror of the second pair.

6. The reader of claim 5, wherein the housing has a base resting on the countertop, and wherein the mirrors of the second pair have lower linear edges generally parallel to, and in close proximity with, the base to reflect at least some of the scan lines at a lower central region of the window.

7. The reader of claim 6, wherein the mirrors of the second pair have lower edges, and wherein the mirrors of the third pair have lower edges closer to the window than the lower edges of the mirrors of the second pair.

8. The reader of claim 1, wherein the rotary component has four planar mirrors arranged around the axis, and wherein there are six, planar stationary mirrors.

9. The reader of claim 1, wherein the light oscillator includes a planar reflector, and an electromagnetic drive for oscillating the reflector.

10. A reader for electro-optically reading indicia associated with objects passing through a point-of-transaction workstation having a countertop, the reader comprising:
    a) a housing supported on the countertop and having a window lying in a generally vertical plane when so supported;
    b) a rotary mirrored component mounted in the housing for rotation about an axis;
    c) a plurality of stationary, folding mirrors mounted in a non-overlapping relationship in the housing and arranged in succession along a row generally about the axis;
    d) a light source mounted in the housing and operative for generating and directing a light beam to the rotary component for reflection therefrom to the stationary mirrors for reflection therefrom through the window to the indicia to be read; and
    e) a drive in the housing for rotating the rotary component to sweep the light beam across the stationary mirrors and form a scan pattern comprising a plurality of scan lines at and past the window;
    f) wherein the stationary mirrors include a first pair of outer mirrors at opposite ends of the row for reflecting first ones of the scan lines, a second pair of inner mirrors located adjacent each other at a central region of the row for reflecting second ones of the scan lines, and a third pair of tilted mirrors intermediate, and tilted relative to, the first and second pairs of mirrors, each tilted mirror of the third pair being located between a respective mirror of the first pair and a respective mirror of the second pair, both tilted mirrors of the third pair being operative for reflecting third ones of the scan lines at an upper central region of the window, thereby creating a full coverage omni-directional scan pattern for reading the indicia.

11. The reader of claim 10, wherein the housing has a parallelepiped shape and has a base on which the housing is supported on the countertop.

12. The reader of claim 10, wherein the rotary component has a plurality of planar mirrors arranged around the axis.

13. The reader of claim 10, wherein each of the stationary mirrors is planar.

14. The reader of claim 10, wherein the housing has a base resting on the countertop, and wherein the mirrors of the second pair have lower linear edges generally parallel to, and in close proximity with, the base to reflect at least some of the scan lines at a lower central region of the window.

15. The reader of claim 14, wherein the mirrors of the second pair have lower edges, and wherein the mirrors of the third pair have lower edges closer to the window than the lower edges of the mirrors of the second pair.

16. The reader of claim 10, wherein the rotary component has four planar mirrors arranged around the axis, and wherein there are six, planar stationary mirrors.

17. The reader of claim 10, wherein the rotary component is located at an elevated, upper area within the housing, and wherein all the stationary mirrors are located at a lower area within the housing below the rotary component.

* * * * *